Patented June 1, 1926.

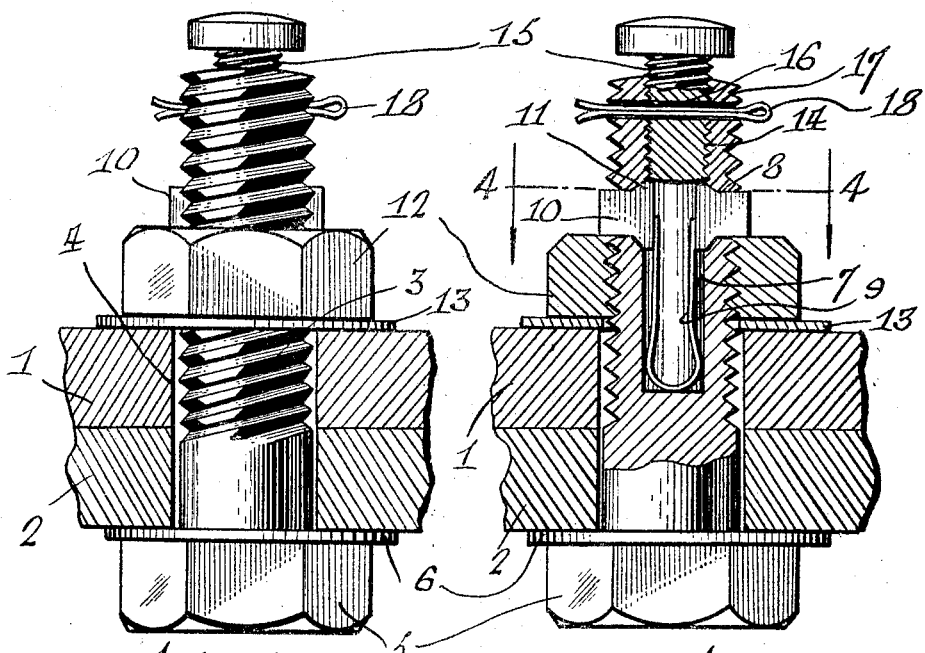

1,587,397

UNITED STATES PATENT OFFICE.

MARIE JONCAS MÉNARD, OF LA TUQUE, QUEBEC, CANADA.

SAFETY LOCK BOLT.

Application filed October 26, 1925. Serial No. 64,970.

The present invention pertains to a novel safety lock bolt designed for use in connection with a bolt and nut device adapted to clamp two members firmly together.

The principal object of the invention is the provision of a device of this character having elements which project from the bolt over the outer surface of the nut in order to prevent the latter from working loose. This object is accomplished by forming in the bolt an axial passage from which extend slots through the wall of the bolt. These slots contain keys normally pressed outwardly by a spring within the recess, whereby the keys engage the outer surface of the nut and hold it against turning off the bolt.

A further feature of the invention is a small screw threaded into the free end of the bolt and firmly engaging the keys to hold them positively in the position described. Also, a cotter pin may be passed through the bolt and screw to maintain the latter securely in position.

The invention is fully disclosed in the following description and in the accompanying drawings in which:

Figure 1 is a side elevation of the device;

Figure 2 is a longitudinal section thereof in locking position;

Figure 3 is a similar section showing the parts in released position; and

Figure 4 is a section on the line 4—4 of Figure 2.

Reference to these views will now be made by use of like characters which are employed to designate corresponding parts throughout.

The numerals 1 and 2 indicate a pair of members which are to be clamped together by means of a bolt and nut. These members may be for example a rail and a fish plate which overlaps the contacting ends of two rails in alinement.

A threaded bolt 3 of usual construction is passed through apertures 4 in the members 1 and 2, the bolt having at one end a head 5 between which and one of the members is inserted a washer 6.

From the remaining end of the bolt is formed an axial recess 7 which extends from the extremity for considerable distance towards the head 5 as shown in Figures 2 and 3. About midway between the ends of the recess, slots 8 are cut through the walls of the bolt. These slots extend into the recesses and are substantially in alinement diametrically through the bolt. In the bottom of the recess is seated a curved or U-shaped spring 9, the ends of which lie within the longitudinal limits of the slots 8. The slots contain keys 10 engaged by the ends of the spring and preferably soldered thereto. The spring normally tends to expand and therefore tends to force the keys outwardly. The inner ends of the keys are formed with enlarged corners 11 to prevent the keys from being pushed out of the slots 8.

Prior to inserting the keys into the slots through the open end of the recess 7, or before allowing the keys to pass beyond the threads of the bolt, a nut 12 is threaded on the bolt and against the remaining member 1 to be clamped. A washer 13 is preferably interposed between the nut and the member. The bolt is so constructed that the lower edge of the slots 8 are flush with the outer surface of the nut 12. The spring and keys may then be passed into the recess and the keys fitted into the slots, or the keys may be allowed to separate if the parts are already in position.

The outer end of the recess is internally threaded as indicated by the numeral 14 in Figure 2.

A screw 15 is threaded into the recess until it engages the keys 10. This screw, bearing tightly against the keys, prevents them from being accidentally pushed back into the slots and recess. Through the screw 15 is drilled an opening 16, and apertures 17 are drilled through the walls of the bolt in order to aline with the opening. Finally, a cotter pin 18 is passed through the apertures and opening 16 in order to prevent the screw 15 from working loose. The keys 10 project outwardly from the bolt and lie on the outer surface of the nut 12 as shown in Figures 1 and 10. The keys therefore function as a lock which prevents the nut from working itself for any extent off the bolt.

While a specific embodiment of the invention has been illustrated and described, it is to be understood that various alterations in the details of construction may be made without departing from the spirit of the invention as indicated by the appended claim.

Having thus fully described the inven- tion, what I claim as new and desire to protect by Letters Patent is:—

A device of the character described comprising a bolt having an axial recess and slots in its wall, said slots extending to said recess, keys disposed in said slots, a spring disposed in said recess and bearing outwardly against said keys, a screw threaded into said recess above said keys and engaging the keys, and means for locking the screw in the recess.

In witness whereof I have hereunto set my hand.

MARIE JONCAS MÉNARD.